(No Model.)  2 Sheets—Sheet 1.

W. MESCH.
PROCESS OF MANUFACTURING STONE AND IRON CEILINGS, FLOORS, AND WALLS.

No. 600,334. Patented Mar. 8, 1898.

WITNESSES,
J. H. Leverett,
N. H. Humphrey.

INVENTOR,
Wilhelm Mesch
By Knight Bros
ATTORNEYS.

THE NORRIS PETERS CO., PHOTO-LITHO., WASHINGTON, D. C.

(No Model.) 2 Sheets—Sheet 2.

W. MESCH.
PROCESS OF MANUFACTURING STONE AND IRON CEILINGS, FLOORS, AND WALLS.

No. 600,334. Patented Mar. 8, 1898.

Witnesses,
M. V. Bedgood
N. H. Humphrey

Inventor,
WILHELM MESCH,
by
his Attorneys.

THE NORRIS PETERS CO., PHOTO-LITHO., WASHINGTON, D. C.

UNITED STATES PATENT OFFICE.

WILHELM MESCH, OF MAGDEBURG, GERMANY.

PROCESS OF MANUFACTURING STONE AND IRON CEILINGS, FLOORS, AND WALLS.

SPECIFICATION forming part of Letters Patent No. 600,334, dated March 8, 1898.

Application filed April 30, 1896. Serial No. 589,682. (No model.)

*To all whom it may concern:*

Be it known that I, WILHELM MESCH, a subject of the King of Prussia, Emperor of Germany, and a resident of Magdeburg, Saxony, German Empire, have invented certain new and useful Improvements in Processes of Manufacturing Stone and Iron Ceilings, Floors, and Walls, of which the following is a specification.

The object of this invention is to construct floors, ceilings, and walls of artificial stone on iron frames and iron beams and studding and in which the iron parts embedded in the artificial stone are subjected to tension strains only.

In the accompanying drawings, forming a part of this specification, and in which like letters of reference indicate like parts in all the views, Figure 1 is a vertical longitudinal sectional view through a floor of my improved construction. Fig. 2 is a transverse vertical sectional view of the same. Fig. 3 is a sectional plan view. Figs. 4 and 5 are detail perspective views of composite slabs or beams constructed according to my invention. Figs. 6, 7, and 8 show modified constructions in longitudinal vertical section. Figs. 9 and 10 are horizontal sectional views showing modified constructions. Fig. 11 is a detail vertical sectional view of a cellar-floor and the foundation-walls. Fig. 12 is a side view of a tank built up of my improved slabs. Fig. 13 is an end elevation of the same. Fig. 14 is a plan view of the same.

In the accompanying drawings, $a$ represents a composite slab or beam made of stone or brick and good mortar, such as cement, and which slab or beam has a recess for receiving the iron reinforcing-bar $b$, which extends transversely through the slabs and is supported by the metal side frames $c$ and $c'$, which have rectangularly-bent ends, which are driven or forced upon the slightly beveled or inclined ends $d$ $d'$ of the slabs and thus stretch the metal bands and act as anchors and have great tensile strength.

The frames $c$ are first laid down and the slabs built into the same. Then the frames $c'$ are laid down, with the bent ends extending upward, and forced on the ends $d$, and so on. $g$ $g'$, &c., are small wedges driven between the bricks or blocks of stone after the side frames $c$ $c'$ are in place to tighten the blocks in the frame. The side frames $c$ $c'$ may be straight, as shown in Figs. 5 and 8, V-shaped, as shown in Figs. 1 and 4, or of the shape shown in Figs. 6 and 7, according to the length of the slabs or beams, the strength, and other requirements.

In constructing a floor or ceiling the composite slabs are usually supported upon the customary I-beams. According to requirements the stone slabs can be placed side by side or greater or less spaces left between them, which can be filled in with masonry, which is supported between the ends by the bar or bars $b$, extending through all of the slabs.

Fig. 6 shows the manner of building a ceiling of large dimensions, in which the composite slabs are reinforced by two transverse bars $b$ and are further strengthened by a pillar or other support at the point $e$. In Fig. 7 the composite slabs are shorter and are provided with only one transverse bar $b$. In this form the structure may be further strengthened by a pillar at point $f$. In both cases the same results are obtained as in Fig. 1 and the slab is protected from being broken by driving the reinforcing-iron upon the slightly-wedge-shaped ends $d$ $d'$.

By means of the above-described stone slabs a solid masonry ceiling can be constructed at a small cost and without requiring supports. Only the joints need be filled with mortar, and thus very little moisture is brought into the structure and not much time is required for drying and the wooden floor can be laid on at once.

Figure 1:
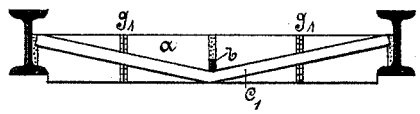
Figure 2:
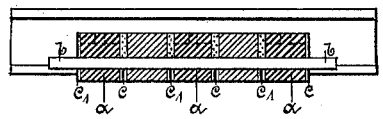
Figure 3:
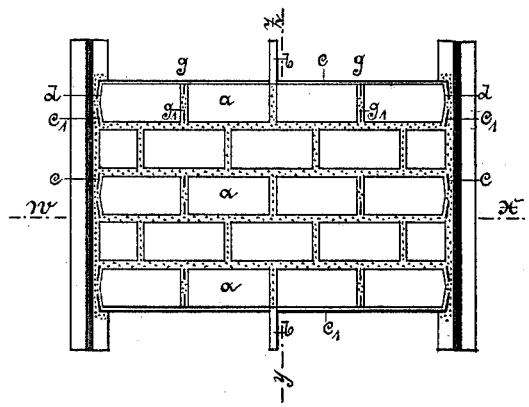
Figure 4:
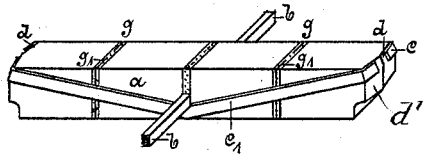
Figure 5:
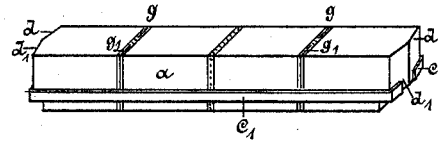
Figure 6:
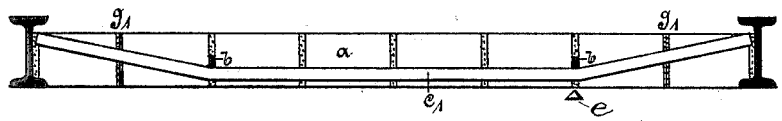
Figure 7:
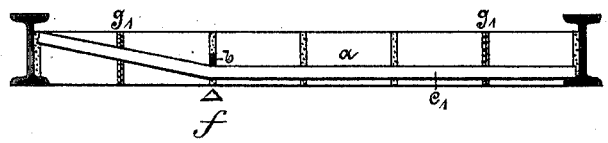
Figure 8:
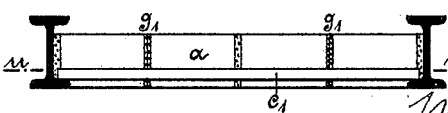
Fig. 8 shows a construction omitting the reinforcing-bar $b$ and intermediate support $e$ or $f$.
Figure 9:
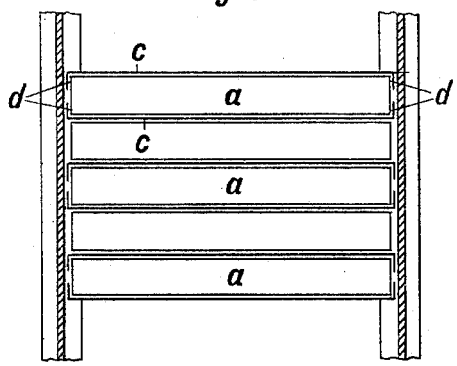
Fig. 9 shows a plan view of the construction shown in Fig. 8; but, if desired, as many as four layers may be built up between the beams.
Figure 10:
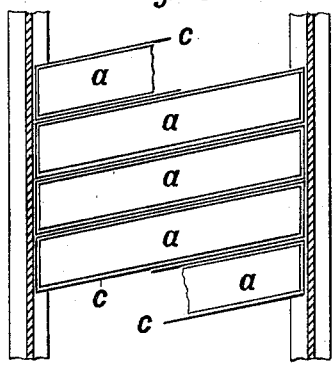
Fig. 10 shows a similar construction in which the stone and mortar are placed in iron frames, which can be tightened and drawn up by means of small wedges (not shown) operating in substantially the same manner as above described in connection with Figs. 4 and 5.
Figure 11:
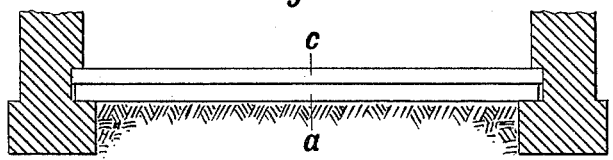

Fig. 11 shows the same construction as Fig. 8, but reversed, so that the under side of the slab is at the top. In this manner a cheap waterproof floor can readily be made for keeping out ground-water and dispensing with the expensive arches.

Figure 12:
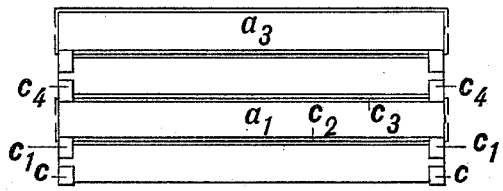
Figure 13:
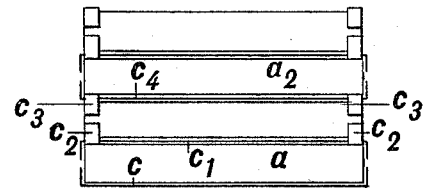
Figure 14:
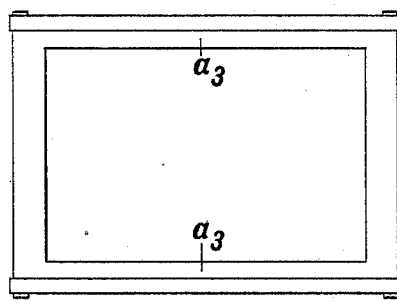

Figs. 12, 13, and 14 show a fluid reservoir or tank formed with thin walls built up of the slabs constructed according to my invention and adapted to withstand great lateral pressure. In the same manner retaining-walls or other walls that are to sustain great lateral pressure are built up.

According to my invention not more than one-half of the material usually employed is necessary to produce structures of the required strength.

Having thus described my invention, what I claim, and desire to secure by Letters Patent, is—

1. A building slab or beam comprising plates, slabs or blocks of stone or brick, and reinforcing stretched metal bands embracing the sides of the plates, slabs or blocks of stone or brick and engaging their ends thereby obtaining a great carrying power by effecting a secure combination and a reciprocal action in a longitudinal direction, substantially as set forth.

2. A composite slab or beam for building purposes, comprising plates, slabs or blocks of stone or brick cemented together, and strengthening metal bands embracing the sides and having bearing-points upon the shorter end surfaces, thereby stretching the binding metal bands, substantially as set forth.

3. A composite building slab or beam comprising blocks of stone or brick, strengthening metal bands or frames embracing the blocks of stone or brick and engaging the ends, and wedges between the blocks for forcing them into engagement with the ends of the strengthening-bands or frames, substantially as set forth.

4. The composite stone or brick slabs formed with slightly inclined or beveled shoulders at the ends and having the strengthening-bands of metal extending from end to end and having bent portions engaging the inclined or beveled shoulders, as set forth.

5. The combination of a stone slab, with metal bands extending longitudinally of the slab and engaging the ends, and a bar extending transversely through the slab and engaging the strengthening-bands, as set forth.

In witness whereof I hereunto set my hand in presence of two witnesses.

WILHELM MESCH.

Witnesses:
M. C. MUTH,
JULIUS MUTH.